Jan. 5, 1960    J. C. KYLE ET AL    2,920,212

PULSE INSERTION DEVICE

Filed July 17, 1958

INVENTORS.
JAMES C. KYLE
GLEN ROBINSON
LOUIS W. EGGERS, JR.

BY Christie, Parker & Hale

ATTORNEYS.

United States Patent Office 2,920,212

Patented Jan. 5, 1960

2,920,212

PULSE INSERTION DEVICE

James C. Kyle, Glendora, Glen Robinson, Pasadena, and Louis W. Eggers, Jr., West Covina, Calif., assignors to Consolidated Electrodynamics Corporation, Pasadena, Calif., a corporation of California Application July 17, 1958, Serial No. 749,273

6 Claims. (Cl. 307—81)

This invention relates to information handling systems and more particularly to such systems wherein a load device requires a train of pulses to synchronize its operation.

In many data handling systems information is collected by sequentially interrogating each one of many signal sources. Signals thus obtained are suitably shaped and supplied as a wave train of pulses to a transmitting device where they are modulated and transmitted to a receiver in a remote location. The receiver demodulates the transmitted signals and routes the information pulses in a given order to a plurality of recording or plotting devices. In practice the signal sources may take the form of various types of transducers from which information is conveyed through the data handling system and stored in a recorder or plotted by a plotting device at the receiver. The receiving station usually includes a stepping mechanism, or equivalent device, which is sequenced in synchronism with the interrogating mechanism by the incoming information signals. The information signals are sent as a wave train of pulses. Receiving station equipment in common use today employs a stepping device which responds to the individual signals in the wave train to perform its sequencing operation. Such equipment resets itself to an initial or starting position in response to a predetermined period of transmission silence which precedes each wave train. If for any reason an information pulse is missing in a wave train, the period of the missing pulse represents a period of transmission silence, and the likelihood exists that this period may be sufficient to cause resetting of the stepping device. Should the stepping device be reset to its initial or starting position, subsequent pulses in the wave train are distributed to the wrong recording or plotting devices. The effect is to lose the information in the remainder of the wave train because the stepping device is not properly oriented with the incoming information pulses. Not until the next period of transmission silence is the stepping device reset to its initial or starting position and sequenced properly with the incoming wave train.

A missing pulse has another adverse effect. Should a missing pulse fail to reset the stepping device, it may nevertheless cause this device to miss a stepping operation. Likewise, this causes the stepping device to be improperly oriented with respect to the remainder of the information pulses of an incoming wave train. The effect is to distribute the information pulses of the incoming wave train to the wrong recording or plotting devices, and hence information in the remainder of the wave train effectively is lost.

The foregoing difficulty is overcome according to the present invention by employing a pulse generating device which inserts pulses in a data handling system during each period that a transducer or other signal source is sampled. Signals from the pulse generator and from the various transducers are supplied to a wave shaping circuit during each sample period, where a sample period may be defined as an allotted period of time during which each transducer or signal source may be interrogated. The information signals, when present, override the effect of the signals from the pulse generator and provide an output pulse which correctly represents information from the interrogated device. This signal is supplied to a transmitting device and sent to a receiving station. If for any reason an information signal should not be supplied to the wave shaping circuit, the signals from the pulse generator are effective to initiate an output pulse, which does not represent information, from the wave shaping circuit that is effective to operate the transmitter. The receiving station responds to this signal and operates the stepping device to its next position. Although correct data from the transducer under interrogation is not obtained, the stepping device is nevertheless operated, and information pulses in the remainder of the wave train are properly distributed by the stepping device to the correct recording or plotting equipment.

According to a preferred arrangement, the pulse generator of the present invention includes a magnet having two pole pieces disposed adjacent one another and a metal disc, with slots disposed radially around the periphery thereof, rotated between the adjacent pole pieces in synchronism with the mechanism which sequentially interrogates the various transducers. As each slot passes between the adjacent pole pieces, the reluctance of the magnetic circuit is changed, and a signal is induced in a winding disposed on the magnet. These signals are supplied to the pulse shaping circuit slightly subsequent to the initiation of information signals. The pulses from the pulse generator are effective to cause operation of the stepping device whenever an information pulse is not received by the pulse shaping circuit.

These and other features of this invention may be more fully appreciated when considered in the light of the following specification and drawings in which.

Figures 1, 2:
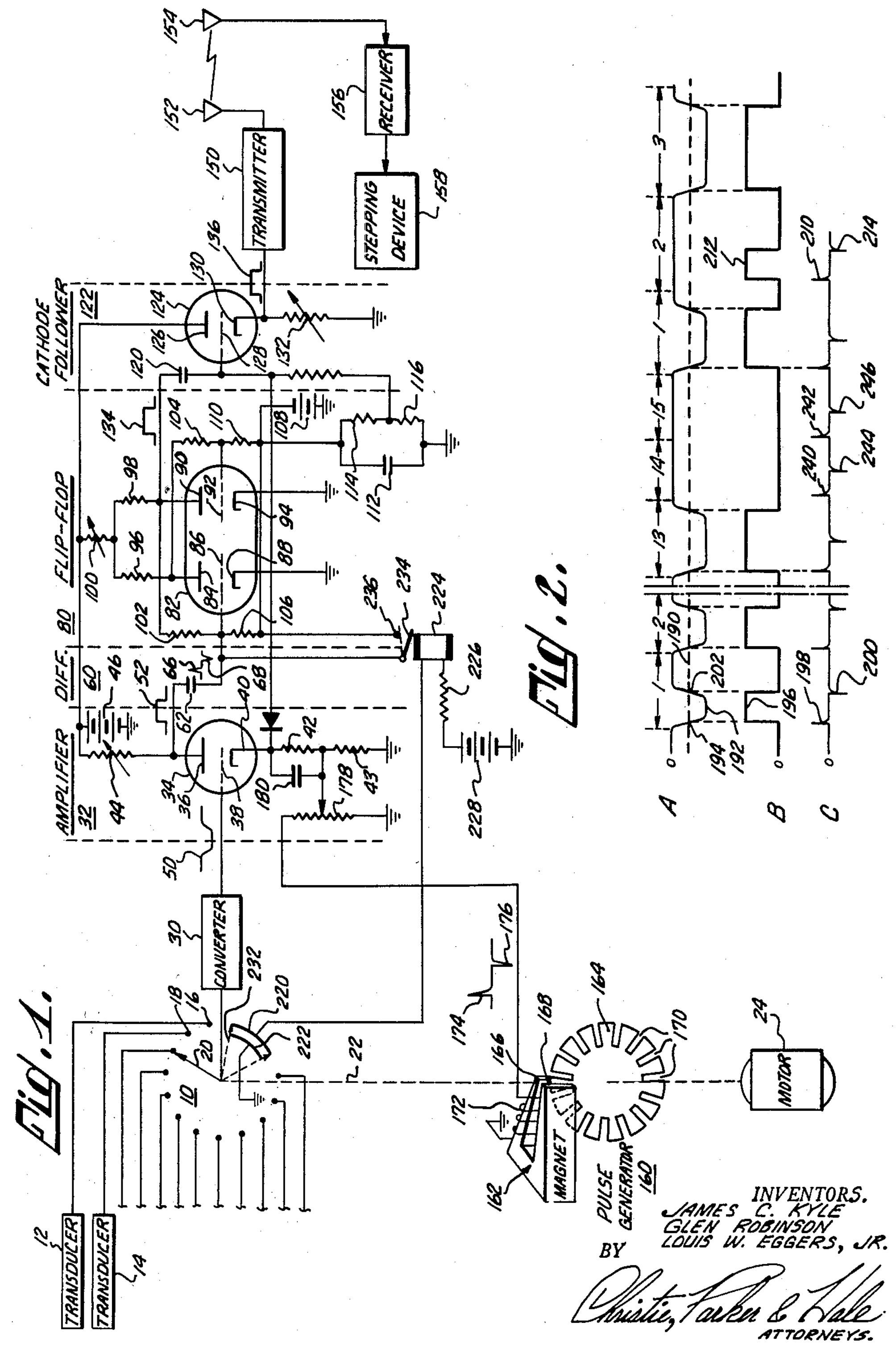
Fig. 1 illustrates a data handling system which includes a pulse generator according to the present invention.
Fig. 2 is a series of curves illustrating the waveforms which may occur at various points in the system of Fig. 1.

Referring first to Fig. 1, a plurality of signal sources are connected to a switch 10 which, though shown as a mechanical device, may be an electronic or electromechanical device. For purposes of discussion, the signal sources are illustrated as transducers of the type which provide an electrical output signal in response to a parameter under investigation. Transducers 12 and 14 are connected to respective terminals 16 and 18, and the remaining terminals are connected to other transducers not shown. An arm 20 of switch 10 is rotated by a shaft, indicated schematically by a dotted line 22, by a motor 24. As the switch arm 20 rotates, it engages the stationary contacts of the switch 10, and an electrical signal from the associated transducer is supplied to a converter 30. The signals from the transducers vary in amplitude in proportion to variations in the parameter investigated. The converter responds to the amplitude of signals supplied thereto and provides an output pulse having a width which varies in proportion to the amplitude of the input signal. The converter 30 may be any one of several types well known in the art for converting signal amplitude to pulse width.

Signals from the converter 30 are coupled to an amplifier 32. This amplifier includes a vacuum tube 34 having an anode 36, a control grid 38 and a cathode 40. Resistors 42 and 43 are connected in series between the cathode 40 and ground. A resistor 180 is connected across the resistor 42. A variable resistor 44 is coupled between the anode 36 and the positive terminal of a battery 46. The pulses of variable duration from the converted 30 have a negative amplitude. If a pulse 50 is applied to the control grid 38, the leading edge is a negative going signal which causes a decrease in current conduction between the anode 36 and cathode 40. This causes the potential at the anode 36 to increase sharply, and the leading edge of a pulse 52 results. A short time later the trailing edge of pulse 50 causes a positive going voltage swing at the control grid 38, and this causes an increase in current conduction between the anode 36 and the cathode 40. Consequently, the potential at the anode 36 decreases sharply and produces the trailing edge of the pulse 52.

The output from the amplifier 32 is supplied to a differentiating network 60 comprising a condenser 62 and a resistor 106. The pulse 52 is differentiated in this network. The leading edge of the pulse 52 yields a positive voltage spike 66, and the trailing edge yields a negative voltage spike 68. These voltage spikes are applied to a flip flop 80. The flip flop circuit includes a twin triode vacuum tube 82 having left and right half sections. The triode in the left half section includes an anode 84 and control grid 86 and a cathode 88. The triode in the right half section includes an anode 90, control grid 92 and a cathode 94. The anodes 84 and 90 are coupled through respective resistors 96 and 98 to a variable resistor 100 which in turn is connected to the positive terminal of the battery 46. The cathodes 88 and 94 are connected to ground. A resistor 102 is connected between the anode 90 of the right half section and the control grid 86 of the left half section of the twin triode 82. A resistor 104 is connected between the anode 84 in the left half section and the control grid 92 in the right half section of the twin triode 82. A resistor 106 is connected between the control grid 86 and the negative terminal of a battery 108 which serves as a negative bias. A resistor 110 is connected between the control grid 92 and the negative terminal of the battery 108. Connected between the negative terminal of the battery 108 and ground is a resistor-capacitor network including a condenser 112 connected in parallel with a pair of resistors 114 and 116. An output signal from the flip flop 80 is taken from the anode 90 and coupled through a condenser 120 to a cathode follower 122. The cathode follower 122 includes a triode 124 having an anode 126, a control grid 128 and a cathode 130. The anode 126 is connected to the positive terminal of the battery 46, and the cathode 130 is connected through a variable resistor 132 to ground. An output signal is taken from the cathode 130.

The positive voltage spike 66 and the negative voltage spike 68 from the differentiating network operate the flip flop 80 to produce a positive output pulse 134. The positive voltage spike 66 drives the control grid 86 positively, causing current conduction between the anode 84 and the cathode 88. As a consequence the potential at the anode 84 decreases, and this negative going level is coupled through the resistor 104 to the control grid 92. The resulting decrease in potential at the control grid 92 inhibits current flow between the anode 90 and the cathode 94, and the potential at the anode 94 rises sharply. This sharp rise in potential constitutes the leading edge of the pulse 134. The positive potential at the anode 90 is coupled back through the resistor 102 to the control grid 86 and maintains current conduction in the triode of the left half section of the vacuum tube 82. The flip flop 80 continues in this state until the negative voltage spike 68 is applied to the control grid 86. It drives the control grid negative and inhibits current conduction in the left half section of the twin triode 82. Consequently the potential at the anode 84 rises and causes the potential at the grid 92 of the right half section to rise also. Current conduction is initiated in the right half section of the twin triode 82 and the potential at the anode 90 decreases abruptly, forming the trailing edge of the pulse 134. The negative swing at the anode 90 is coupled back to the control grid 86 and maintains nonconduction in the left half section of the twin triode 82. The flip flop 82 continues in this state until a subsequent positive voltage spike 66 is received. This occurs when the switch arm 20 moves to the next contact and another transducer is sampled. The pulse 134 from the flip flop 80 is applied to the control grid 128 of the cathode follower 122 where current amplification takes place and a pulse 136 of like polarity is taken from the cathode 130 and applied to a load device. The load device is illustrated as a transmitter 150.

The transmitter 150 responds to pulses of variable width and provides properly modulated signals to an antenna 152. The signals are transmitted to a receiving antenna 154 and supplied to a receiver 156 where the transmitted signals are demodulated and employed, among other purposes, to operate a stepping device 158. The stepping device may be a mechanical, electromechanical or electronic device that routes incoming signals to recording or plotting apparatus, not shown, which indicates graphically the received information. In practice there may be one recording device for each of the transducers connected to the stepping switch 10. In this fashion variations taking place at each transducer are indicated graphically at the receiving station. Quite often the successful operation of a stepping device depends upon receipt of pulses which cause it to operate in synchronism with an incoming wave train and thereby route the incoming pulses to corresponding ones of many recorders. This insures that the signals from a given transducer are separated from the wave train and directed to a given recorder or plotting device which in turn plots or records all of the information signals of only one of the many transducers. To insure successful operation of the stepping device it is customary to reset it to its starting position at the end of each wave train. This may be accomplished with special pulses, but one technique employed is that of not transmitting signals for a given period of time. When the receiver 156 receives no signals for a predetermined period of time, the stepping device 158 responds to this transmission silence and resets itself to the starting position. Should one or more of the transducers fail to provide an output signal during interrogation, there arises a likelihood that the stepping switch 158 may be reset inadvertently to its starting position. In such case the signals in the remainder of an incoming wave train are distributed to the wrong recording or plotting equipment. When the subsequent period of transmission silence occurs the stepping device is reset to its starting position and the next incoming wave train of signals is properly routed to associated recording or plotting devices provided no signals in this wave train are missing, such as by the faulty operation of a transducer.

In order to secure correct operation of the stepping device 158, it is desirable to avoid missing pulses in the transmitted wave train. For this purpose a pulse inserting device is employed to supply pulses to the amplifier 32 whenever any transducer connected to the converter 30 fails to provide a signal to the amplifier. A pulse generator 160 supplies pulses to the amplifier 32. The pulse generator includes a magnet 162 and a disc 164 arranged as shown. This disc is rotated by the shaft 22 and passes between the pole pieces 166 and 168. Equally spaced about the periphery of the disc 164 are a plurality of slots 170. As each slot passes between the pole pieces 166 and 168 the reluctance of the magnetic path between these pole pieces changes and a signal is induced in a winding 172. The leading edge of each slot causes a signal of one polarity to be induced in the winding 172. The trailing edge of each slot causes a signal of opposite polarity to be induced in the winding 172. Thus each slot causes a positive signal such as 174 and a negative signal such as 176 to be induced in the winding 172. Such signals are of such short duration that they may be referred to as voltage spikes. These signals are tapped off of a potentiometer 178 and applied through the resistor 42 and the condenser 180 to the cathode 40 of the amplifier 32. The disc 164 is so positioned on the shaft 22 that the voltage spike 174 occurs in time slightly after the switch arm 20 engages each of its associated stationary contacts. If a signal is supplied through the switch 10 and converter 30 to the control grid 38 of the amplifier 32, the differentiator 60 and the flip flop 80 and the cathode follower 122 are operated in the manner previously explained. Should any transducer under interrogation fail to supply a signal to the control grid 38 of the amplifier 32, the pulse generator 160 is effective to operate the amplifier 32 and in turn supply an output pulse from the cathode follower 122. It is convenient at this point to describe how the pulses 174 and 176 cause an output pulse from the cathode follower 122.

The positive voltage spike 174 from the pulse generator 160 drives the cathode 40 of the amplifier 32 positively and reduces current conduction in the vacuum tube 34. Consequently the potential at the anode 36 rises sharply and forms the leading edge of the pulse 52. This signal is coupled through the differentiator 60 to the control grid 86 of the flip flop 80 and initiates current conduction in the left half section of the twin triode 82 and nonconduction in the right half section of the twin triode 82. There is a sharp rise in the potential at the anode 90 which forms the leading edge of the pulse 134 which in turn is coupled to the control grid 128 of the cathode follower 122 and forms the leading edge of the output pulse 136. A short time later the negative voltage spike 176 from the pulse generator 160 drives negatively the cathode 40 of the amplifier 32. There is a consequent increase in current conduction in the vacuum tube 34 with a sharp decrease in potential at the anode 36. This forms the trailing edge of the pulse 52 which in turn is coupled through the differentiator 60 and drives negatively the grid 86 of the flip flop 80. The result is to establish current conduction in the right half section of the twin triode 82 and nonconduction in the left half section of the twin triode 82. The output potential at the anode 90 drops sharply and forms the trailing edge of the pulse 134. This negative going signal is coupled to the control grid 128 to decrease current conduction in the vacuum tube 124. There is a sharp decrease in potential at the cathode 130 which forms the trailing edge of the output pulse 136. Thus it is seen how the positive voltage spike 174 and the negative voltage spike 176 from the pulse generator 160 establish an output pulse 136 from the cathode follower 122 whenever there is a failure by any transducer to supply a signal through the switch 10 and converter 30 to the control grid 38 of the amplifier 32. The positive and negative voltage spikes 174 and 176 are supplied to the cathode 40 of the amplifier 32 shortly after the switch arm 20 engages each of its associated stationary contacts. If there is a signal supplied by the transducer under interrogation through the converter 30 to the control grid 38 of the amplifier 32, the action of the positive voltage spike 174 merely aids the events taking place in the amplifier 32. The negative voltage spike 176, however, occurs a short time later and tends to establish current conduction in the amplifier 32, perhaps prematurely. The effect however of a negative pulse 50, if one is present, on the control grid 38 has a greater controlling action than the negative pulse 176 on the cathode 40. Consequently current conduction in the vacuum tube 34 of the amplifier 32 is not interrupted. Current conduction in this tube continues until the trailing edge of the pulse 50 causes the grid 38 of the vacuum tube 34 to rise and bring about the sequence of events explained above which ultimately establish the trailing edge of the output pulse 136. If the pulse 50 on the control grid 38 has terminated when the negative voltage spike 176 arrives, no change is effected.

In operation a wave train of pulses is supplied from the cathode follower 122 each time the movable arm 20 of switch 10 makes a complete revolution. The signal conveyed from each transducer by the switch 10 to the converter 30 is one which varies in amplitude, and the converter 30 changes the amplitude signal to an output pulse having substantially constant amplitude but variable width. The width of the output signal from the converter 30 is directly proportional to the amplitude of the input signal supplied thereto. The output signals from the converter 30 form a wave train of the type indicated by the curve A in Fig. 2. As shown in this curve these signals have substantially a constant amplitude in the negative direction. The current cut off point for the vacuum tube 34 is indicated by the dotted line 190. Each of these signals operate the amplifier 32, differentiator 60, flip flop 80 and cathode follower 122 in the manner previously described to establish corresponding signals at the output of the cathode follower 122. Such signals constitute a wave train of positive signals, as indicated in curve B of Fig. 2, having a substantially constant amplitude and varying in width in direct proportion to the amplitude of the signals from the transducers associated with the switch 10. The pulses from pulse generator 160 are indicated in curve C of Fig. 2. The leading edge of the pulse 192 drives the grid 38 of the amplifier 32 below cut off when its negative amplitude exceeds that value indicated by the dotted line 190. This point is indicated at 194 on the leading edge of pulse 192. This action initiates the leading edge of the output pulse 196 in curve B. Simultaneously the positive voltage spike 198 from the pulse generator 160, displaced slightly in time with respect to the initiation of the pulse 192, serves also to inhibit current conduction in the vacuum tube 34. Subsequently the negative voltage spike 200 applied to the cathode 40 of the triode 34 tries to initiate current conduction, but it is unsuccessful because, as previously explained, the negative signal 192 on the control grid has an overriding effect which maintains this tube nonconductive. A short time later the trailing edge of the pulse 192 decays to the negative level indicated at 202; whereupon current conduction is initiated in the triode 34 of the amplifier 32; and this results ultimately in the trailing edge of the output pulse 196 decaying to zero as indicated in curve B. The sampling of each transducer and converting its amplitude to a signal of corresponding width with constant amplitude must be performed within a basic time period, referred to as a sample period. It is during this period that the output pulses of variable width are generated, transmitted and utilized by a recording or plotting device. The basic sample periods are indicated in curve A by the numerals 1 through 15. The 15 sample periods correspond to the 15 positions of the switch 10. Likewise, the disc 164 of the pulse generator 160 has 15 slots corresponding to the 15 positions of the switch 10. If the switch 10 is employed with a different number of stationary contacts, the number of slots in the disc 164 are correspondingly changed, and the number of output signals in a wave train varies accordingly for each revolution of the switch 10. For each sample period shown in curve A of Fig. 2 there is a corresponding output signal in curve B whenever a transducer under interrogation supplies a signal to the amplifier 32. As a matter of convenience it is assumed that during sample period 1 the switch arm 20 engages the contact 16 and samples the transducer 12. During sample period 2 the switch arm 20 engages the contact 18 and samples the transducer 14. The switch arm continues in a counterclockwise direction until all transducers have been interrogated.

In order to illustrate how a missing pulse is properly inserted, assume that during the second sample period, illustrated on the right end of the curve A in Fig. 2, the transducer 14 and converter 30 fail to supply a signal to the amplifier 32. Were the output from the cathode follower 122 to remain zero during the sample period 2, there is a likelihood that the stepping device 158 would not be operated during this period. In such case, the signals from the remaining sample periods of this wave train would be routed to the wrong recorders or plotting devices. It is recalled, however, that the pulse generator 160 supplies positive and negative voltage spikes to the amplifier 32 during each sample period. Accordingly, the positive voltage spike 210 in curve C of Fig. 2 drives the triode 34 of the amplifier 32 into nonconduction and generates at the output of the cathode follower 122 the leading edge of a pulse 212, indicated in curve B of Fig. 2. A short time later a negative voltage spike 214 in curve C of Fig. 2 generates the trailing edge of the output pulse 212 in curve B. Therefore, the output pulse 212 is supplied to the transmitter 150 and is ultimately received by the stepping device 158 which in turn is operated. The output pulse 212 is meaningless as far as data is concerned, but it serves to operate the stepping device 158 so that subsequent information pulses in this wave train are routed to the proper recording or plotting devices. Thus it is seen how the pulse generator 160 serves to operate the stepping device 158 whenever there is an absence of an output signal from the converter 30 during any sample period.

Various techniques are employed to reset the stepping device 158 to its initial or starting position prior to the commencement of a wave train of information signals. One such technique is to enforce transmission silence for a predetermined period. During this period no signal is supplied to the stepping device, and in response thereto it is automatically reset to its initial or starting position. In order to insure transmission silence at the end of a wave train, the switch 10 is provided with a pair of arcuate contacts 220 and 222. The arcuate contact 222 is grounded, and the arcuate contact 220 is connected through a relay 224 and a resistor 226 to a battery 228. When the switch arm 20 travels between the positions indicated by the dotted lines 230 and 232, the arcuate contact 220 is shorted to ground through the arcuate contact 222. During this time the relay 224 is energized and operates the relay arm 234 against the contact 236. Accordingly, the resistor 106 in the flip flop 80 is shorted and the grid 86 is connected directly to the negative bias battery 108. The left half section of the twin triode 82 is non-conductive during this period while the right half section is conductive. This insures that the output signal from the anode 90 to the control grid 128 of the vacuum tube 124 remains substantially at ground level. Accordingly, the output signal from the cathode follower 122 is substantially zero, and this is indicated in curve B of Fig. 2 during the sample periods 14 and 15. The positive voltage spikes 240 and 242 are applied to the cathode 40 of the triode 30 during this period, and they serve to drive the triode 34 into nonconduction. The negative voltage spikes 244 and 246 drive the triode 34 into conduction. The positive voltage spike 240 and the negative voltage spike 244 produces an output pulse 52 at the anode 36 of the vacuum tube 34. In a similar fashion the positive voltage spike 242 and the negative voltage spike 246 generate another pulse 52 at the anode 36 of the vacuum tube 34. However, such pulses 52 are ineffective to change the negative signal level at the control grid 86 of the flip flop 80 because the resistor 106 is shorted out during this period and the control grid 86 connected directly to the negative bias battery 108. Accordingly the pulse generator 160 is ineffective to develop an output signal at the cathode follower 122 during the sample periods 14 and 15. During these periods transmission silence is maintained, permitting the stepping device 158 to be reset. As soon as the switch arm 20 later engages the contact 16, the sample period 1 of the next wave train begins. Hence it is seen how transmission silence is enforced for a predetermined period, two sample periods in the illustrated case, whereby the stepping device 158 may be reset to its initial or starting position.

Thus it is seen that according to this invention a plurality of signal sources may be interrogated and a wave train of information signals sent to a remote station where they serve to operate a stepping device as well as convey information. A pulse generating device serves to insert pulses in the wave train whenever a transducer or its converting apparatus fails to supply an output signal, and a period of enforced transmission silence serves to reset a stepping device.

What is claimed is:

1. A device including a plurality of signal sources, a wave shaping circuit including an amplifier, differentiator, flip flop and cathode follower serially connected, means for sequentially interrogating each signal source and providing an output signal from each signal source, said last-named means being coupled to the amplifier of said wave shaping circuit whereby a wave train of signals is provided from the cathode follower of said wave shaping circuit, a pulse generating device operated in synchronism with the means for sequentially interrogating each signal source and providing an output signal for each signal source interrogated, means coupling the pulses produced by said pulse generator to the amplifier of said pulse shaping circuit whereby a wave train of signals is provided from the cathode follower of said wave shaping circuit even though a given signal source may supply no output signal to the amplifier of said wave shaping circuit when interrogated by said means for sequentially interrogating each signal source.

2. An apparatus including a plurality of signal sources, sampling means for sequentially interrogating each signal source and providing an output signal, a wave shaping circuit having an output, said sampling means being coupled to said wave shaping circuit, the output of said wave shaping circuit comprising a series of signals forming a wave train, a pulse generating device, means to operate said pulse generating device in synchronism with said sampling means, said pulse generating device providing an output signal each time the sampling device interrogates each signal source, means coupling the pulses from said pulse generating device to the wave shaping circuit whereby the presence of signals in the wave train from said pulse shaping circuit are insured even though no signal is presented to the pulse shaping circuit by the sampling device.

3. The apparatus of claim 2 wherein means is coupled between said wave shaping circuit and said sampling means for insuring transmission silence for a predetermined period of time.

4. The apparatus of claim 3 wherein the means for insuring transmission silence for a predetermined period of time includes a relay, a resistor and a negative bias source connected in said wave shaping circuit and the relay is operated by the sampling means to short circuit the resistor and connect the bias source directly to said wave shaping circuit whereby no output signal is derived from the wave shaping circuit as long as the resistor is short circuited.

5. An apparatus including a plurality of signal sources, sampling means for sequentially interrogating each source and providing an output signal, a wave shaping circuit having an output, said sampling means being coupled to said wave shaping circuit, the output of said wave shaping circuit comprising a series of signals forming a wave train, a pulse generating device including a magnet having two pole pieces disposed adjacent to one another, a disc having slots in its outer periphery positioned for rotation between said pole pieces whereby the slots in the outer periphery pass between the pole pieces, means coupled to said disc and the sampling means for operating them in synchronism, a winding disposed on said magnet and coupled to said wave shaping circuit, said pulse generating levice providing an output signal from said winding each time the sampling device interrogates each signal source, whereby the presence of signals in the wave train from said pulse generating circuit are insured even though no signal is presented to the pulse shaping circuit by said sampling device.

6. A wave shaping circuit having a first input terminal for receiving information signals and a second input terminal for receiving control signals, a pulse generating device adapted to supply pulses for control purposes to said wave shaping circuit in synchronism with information signals supplied to said first terminal, said pulse generator including a magnet having two pole pieces disposed adjacent to one another, a rotatable disc having slots in the periphery thereof, means to rotate the slots of the disc between the adjacent pole pieces in synchronism with information signals supplied to the first terminal, whereby a control signal is supplied to said wave shaping circuit which is effective to provide an output signal from the wave shaping circuit in the absence of an information signal to the first terminal.

No references cited.